INVENTOR.
JACK N. BINNS
BY
ATTORNEY

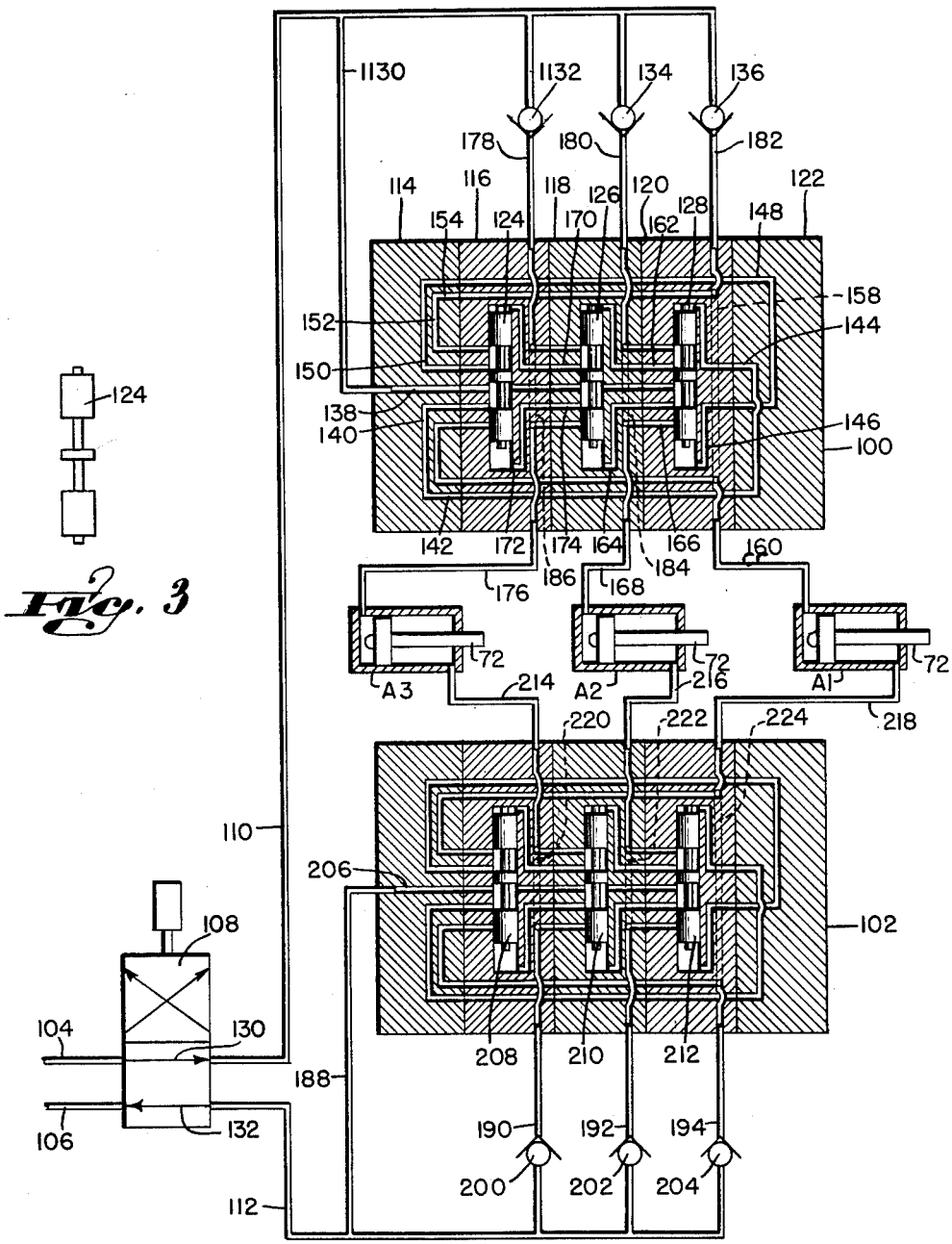

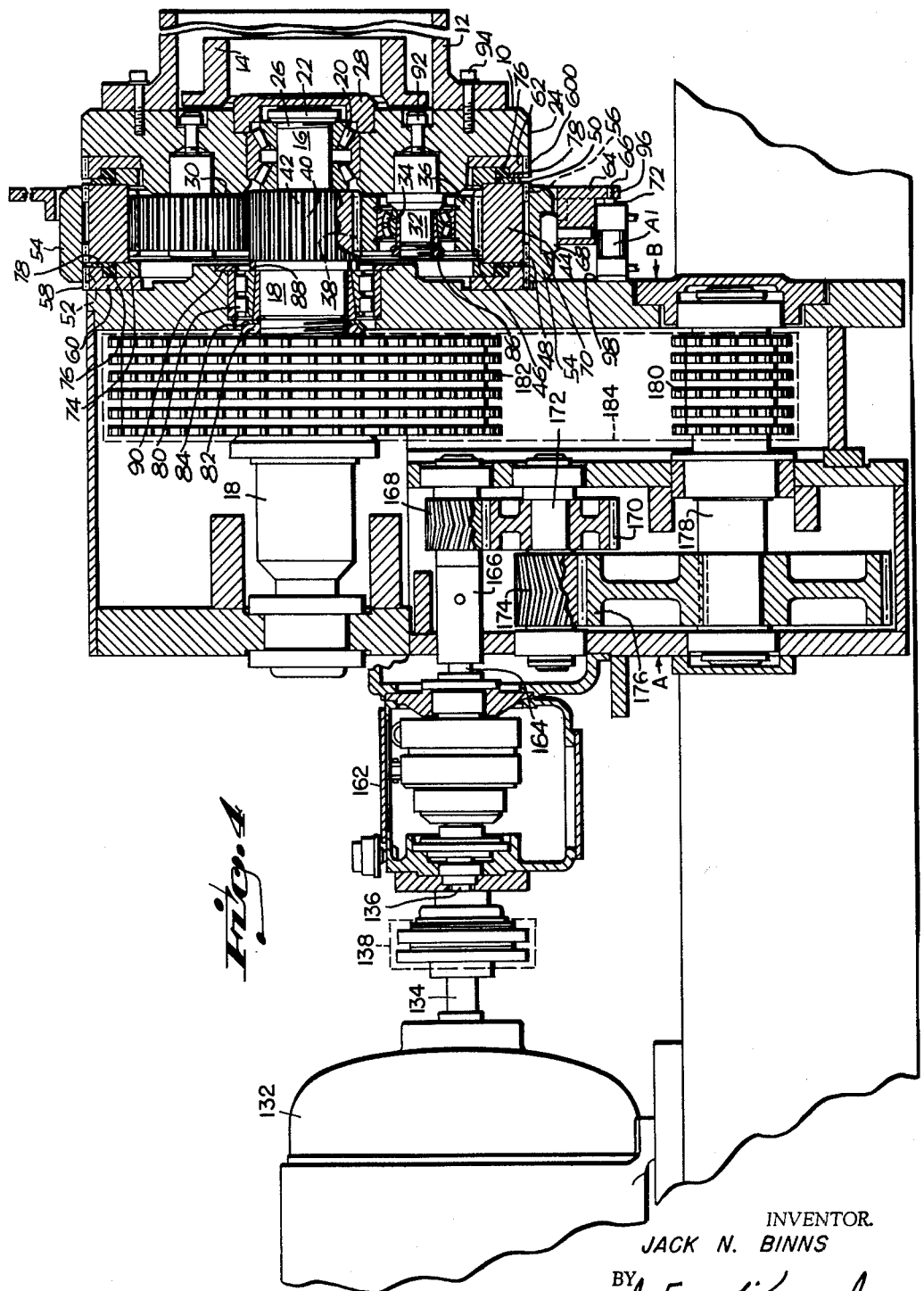

United States Patent Office 3,127,801
Patented Apr. 7, 1964

3,127,801
CONTOUR ROLL-TURNING LATHE DRIVE MECHANISM AND GEAR SHIFTING ASSEMBLY
Jack N. Binns, 4836 Oaklawn Drive, Cincinnati, Ohio
Filed Nov. 3, 1959, Ser. No. 850,575
15 Claims. (Cl. 82—29)

The present invention relates to improvements in a gear shifting mechanism for use in the heavy headstock assembly of a roll-turning lathe.

An object of the invention is to facilitate the work of shifting the heavy gearing in the headstock drive of a roll-turning lathe.

Another object is to provide in a machine of the character stated, a gear shifting mechanism which is so constructed as to smoothly and without undue strain on the parts effect the shifting of heavy gearing and associated headstock elements.

A further object of the invention is to provide an improved hydraulic system for moving an object with ease and great precision, along a straight line, without any perceptible tendency to cock or tilt such object.

Another object is to provide a shifter mechanism for gearing, which embodies the advantages of simplicity, reliability, and accessibility of parts.

A further object is to so construct a gearing arrangement with shifting mechanism therefor, that the shifting mechanism may be serviced, or replaced when necessary, without dismantling the gearing; and conversely, repairs or replacements in the gearing may be easily performed without extensive dismantling of the shifting mechanism.

The foregoing and other objects are attained by the means described herein and illustrated upon the accompanying drawings, in which:

FIG. 2 is a schematic view of a hydraulic shifting mechanism for the gearing illustrated upon FIG. 1.

FIG. 3 is a detail view showing a one-piece ram.

FIG. 4 is a sectional view taken through the complete gear train of the headstock of the lathe illustrating the headstock, face plate, spindle, planetary transmission means and source of power.

Figure 1:
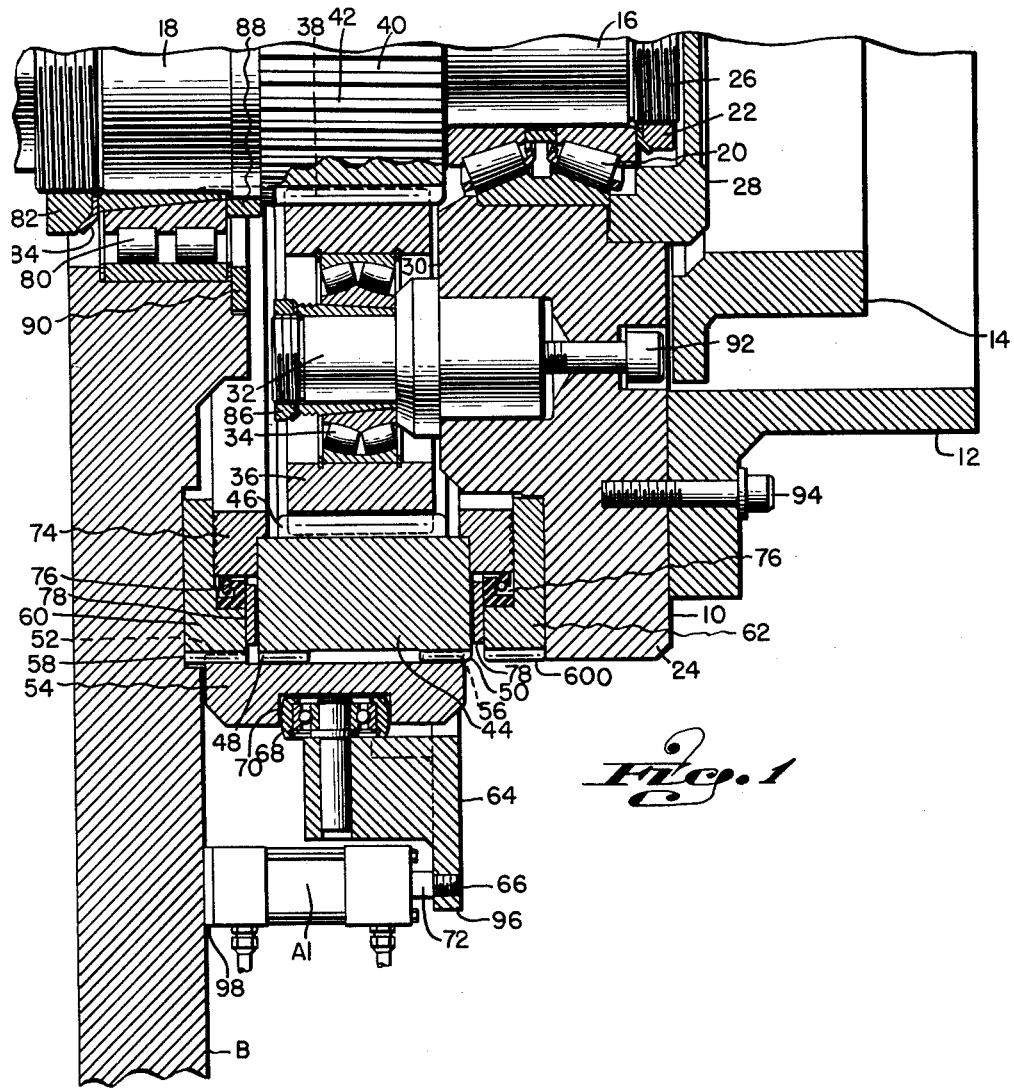
FIG. 1 is a fragmentary cross-sectional view of a planetary gear drive for the face plate of a roll-turning lathe.

Reference is made to my co-pending application Serial No. 648,396 filed March 25, 1957, now Patent No. 2,022,690 for a disclosure of the lathe in detail, particularly as concerns the lathe headstock of Fig. 10, to which the instant application pertains, with certain variations to be referred to hereinafter.

It may be noted here that B denotes the front wall of the headstock, and 24 denotes the face plate, as in the aforesaid patent.

FIGS. 1 and 4 of the instant application illustrate a planetary gear drive for the face plate 24, which latter carries at its forward face 10 any suitable means to couple the face plate to the workpiece or roll to be turned. Such coupling means may be in the form of coupling boxes 12 and 14 which rotate with the face plate. The coupling means constitutes no part of the present invention, and may be considered simply a chuck for driving the workpiece.

Face plate 24 is mounted for rotation upon the reduced end 16 of drive spindle 18, preferably with the use of an anti-friction bearing indicated at 20. A nut 22 engaging the threaded end 26 of the spindle holds the bearing and the face plate in position upon the spindle. A cap 28 protects the bearing against entry of dirt, and may serve also as a lubricant retainer.

Extending from the rear face 30 of the face plate is a stud 32, upon which is rotatably mounted by means of an anti-friction bearing 34 a planetary gear 36 having gear teeth 38 in constant mesh with the teeth 42 of a sun gear 40 carried by spindle 18. The sun gear 40 may be formed integral with the spindle, as is common practice. The face plate may carry a plurality of planetary gears such as 36, each meshing with the sun gear.

Surrounding the planetary gear or gears is a ring gear 44, concentric with spindle 18, the ring gear having internal teeth 46 in constant mesh with the teeth of the planetary gears. Ring gear 44 carries also two spaced rows of external teeth 48 and 50. Teeth 48 may be engaged by the internal teeth 52 of a slidable coupling ring 54, upon shifting of the coupling ring to the right in FIG. 1. Such shifting of the coupling ring 54 effects disengagement of its second set of internal teeth 56, from the ring gear teeth 50. The coupling ring is in effect a gear with internal teeth.

In the position of the coupling ring illustrated, its gear teeth 56 are in mesh with the teeth 50 of ring gear 44, whereas its gear teeth 52 are in mesh with the teeth 58 of a locking ring 60 fixedly mounted upon the headstock wall B. Accordingly, with the coupling ring 54 and the ring gear 44 so locked against rotation, the sun gear in rotating will rotate the planetary gear 36 while advancing the latter in a circular orbit. The planetary gear, so orbiting about the sun gear, carries the face plate with it by reason of the stud shaft connection 32 with the face plate. Thus, the face plate is rotated at a reduced speed about its mounting on the spindle at 16.

Now, if the coupling ring 54 be shifted to the right in FIG. 1, its teeth 56 will move over into mesh with the teeth 600 of a locking ring 62, while disengaging from the teeth 50 of ring gear 44; at the same time, the coupling ring teeth 52 will leave the teeth 58 of the headstock locking ring 60, and move over into engagement with the teeth 48 of ring gear 44. Since the locking ring 62 is fixed upon the rear of the face plate, the coupling ring in its shifted position will lock the ring gear 44 to the face plate locking ring 62, thereby causing the parts 44, 54, 36, and 24 (the face plate), to move unitarily with the rotating sun gear, at spindle speed. This will be the high speed rotation of the face plate.

It will be understood from the foregoing that the coupling ring 54 is subject to selective shifting from a low speed to a high speed position, and back to the low speed position, these movements being controlled by a bodily displaceable shifter ring indicated at 64, and whose movements are initiated by hydraulic cylinder means attached thereto at 66. The shifter ring preferably has an anti-friction roller connection at 68, with an annular track 70 formed in the periphery of the coupling ring 54, as will be understood. Extension and retraction of the hydraulic cylinder piston rod 72 moves the shifter ring 64 forward and back, between its limits of travel, for locking to either the headstock locking ring 60 or the face plate locking ring 62.

With particular reference now to FIG. 4, the numeral 132 denotes a variable speed electric motor, preferably, though not necessarily of direct current type. Motor shaft 134 is connected to headstock input shaft 136 by means of a torque limit coupling indicated generally by the block outline 138. Reference may be had to Patent No. 3,022,690 for the structural details of coupling 138.

Shaft 136 may comprise the input shaft of a commercial planetary transmission denoted generally by the numeral 162 having an output drive shaft 164.

Input planetary transmission 162 represents a variable reduction in which the speed of output shaft 164 is reduced and the torque increased by a like amount; or, wherein the speed and torque of both shafts 164 and 136 are the same. A fixed reduction gear train is also incorporated in the headstock between letters A and B, of FIG. 4, in which the speed is reduced and torque is increased by a fixed ratio.

With reference now to the fixed reduction portion of the transmission, the numeral 166 indicates a splined sleeve pinned to herringbone stem pinion 168 which couples shaft 164 thereto. Herringbone gear 170 is driven by pinion 168 and keyed to stem 172 of herringbone pinion 174. Pinion 174 drives herringbone gear 176, which is keyed to sprocket shaft 178.

A sprocket pinion 180 keyed to shaft 178 is interconnected to sprocket wheel 182 by means of a flexible drive member such as, by way of example, a multiple strand roller pin 184. Sprocket wheel 182 is keyed to spindle 18 which is coaxial with face plate 24.

Before proceeding with the description involving FIG. 2, certain details shown in FIG. 1 might well be mentioned. For example, 74 indicates a ring gear guide member embracing opposite sides of the ring gear 44, serving to limit and control end play in the direction of spindle extension. About the guide is located a lubricant seal 76, including a retainer 78, at opposite sides of the ring gear. At 80 is shown an anti-friction bearing nested in the headstock wall, for supporting the rotating spindle 18, the bearing being retained by a lock nut 82 and lock washer 84 surrounding the spindle. At 88 and 90 are indicated retainers for the inner and outer races, respectively, of the spindle bearing.

A lock nut assembly 86 retains the planetary gear bearing 34, in a manner readily understood. Screw 92 secures the planetary gear stud to the face plate, and screw 94 fastens the chuck or coupling means 12—14 to the face plate.

The hydraulic means disclosed for advancing and retracting the shifter ring to change the speed of face plate rotation is a matter of importance to the present invention. Due to the unusual size and weight of the parts needed in turning the massive rolls which constitute the workpiece, the speed change for the face plate is accomplished with the use of force of considerable magnitude. To move the large shifter ring and associated parts with the use of ordinary means, such as yokes or forks, has proven impractical because of size limitations and inability of such parts to act without bending or distorting under heavy application of force. Another troublesome factor was the tendency of the shifter ring to cock from a normal right angular relationship with the spindle axis in the process of effecting the speed change, thereby resulting in imposing severe strains and undue wear upon the geared assembly. The effort required to shift the gearing was therefore considerable, and beyond the ability of some workmen to accomplish.

In accordance with the present invention, the shifting means employed comprises a series of hydraulic cylinders arranged upon the front wall of the headstock, the cylinder being spaced apart, and located from the main spindle 18, so that their piston rods 72 act upon the flange 96 of the shifter ring with equal force to advance and retract said ring without perceptible cocking.

In the example illustrated, three equally spaced hydraulic cylinders are employed, these being identified by the characters A1, A2, and A3. The number of cylinders may be increased if considered necessary or desirable. The bases 98 of all the cylinders are fixed mounted upon the front wall B of the headstock, or upon any other fixed support which will ensure projection of the piston rods in a straight line parallel to the headstock spindle.

Referring now to FIG. 2, 100 and 102 indicate generally two fluid distributors of hydraulic fluid under pressure, the function of which is to feed fluid to the cylinders A1, A2, and A3, sequentially in very small charges, until the piston rods of all the cylinders are fully extended.

Thereby the shifter ring 64 of FIG. 1 may be moved to its extreme right hand position, as previously explained.

By reversing the entry of fluid into the distributors, the rods of all the pistons may be retracted in like manner, to return the shifter ring to the left-hand limit of travel, illustrated by FIG. 1.

In FIG. 2, the pair of pipes 104 and 106 may represent a source of hydraulic fluid under pressure, controlled by a flow reversing valve indicated schematically at 108, whereby fluid may be directed at will into either of the feed pipes 110 or 112. The arrangement is such that when one feed pipe is charged with fluid from the source, the other feed pipe becomes an exhaust or return line to the source.

Each distributor comprises a body constituted of a plurality of connected block sections 114, 116, 118, 120 and 122, containing various passageways along which the hydraulic fluid may flow to act upon one-piece rams indicated at 124, 126, and 128, which may be rapidly reciprocated in their respective chambers shown. As will become apparent later, the rams are fluid-projected sequentially, and repeatedly, from one end to the other of their respective chambers, as long as fluid under pressure is supplied from the source 104—106, and until the fluid distributed thereby completely fills the cylinders A1, A2, and A3 at one side of their respective pistons. According to FIG. 2, the cylinders are ready to be filled with fluid behind their pistons, to project the piston rods from the cylinders, or toward the right.

Assuming that fluid under pressure is valved through the feed lines as indicated by the arrows 1130 and 1132, FIG. 2, the fluid can travel only through conduits 110 and 130, due to the presence of check valves 132, 134, 136. From 130 it enters bore 138 which is common to all the ram chambers. Entering the chamber of ram 124, the fluid follows the course: 140, 142, 144, to the ram 128, which moves downwardly under the pressure of fluid imposed, causing a displacement of fluid through bores 146, 148, 150, 152, 154, 158, and tube 160, to minutely advance the piston of cylinder A1.

Ram 128 being now lowered, fluid from common line 138 can pass through bore 162 to apply pressure to the top of ram 126, causing it to move to fully lowered position, thereby to displace fluid from beneath said ram through bores 164, 166, and into tube 168, to minutely advance the piston of cylinder A2.

Rams 128 and 126 being now lowered, fluid from common line 138 can pass through bore 170 to the top of the remaining ram 124, and depresses said ram to fully lowered position. Fluid thus displaced from beneath ram 124 takes the course 172, 174, 176, to minutely advance the piston of cylinder A3.

Thus it is apparent that the hydraulic cylinders A1, A2, and A3 have been advanced in succession, by very slight but equal amounts, to begin moving the shifter ring 64 of FIG. 1, toward the right. After all the rams 124, 126, 128 are disposed at the opposite ends of their respective chambers, pressure of fluid from the source 104–106 continues to act upon the rams for sequentially returning them to the FIG. 2 position, resulting in another cycle of minute fluid charges delivered to cylinders A1, A2, and A3, for again slightly advancing their piston rods. The paths of fluid travel for so returning the rams to the initial position of FIG. 2 can be traced on the diagram, but it is believed unnecessary to burden this disclosure with a lengthy explanation thereof. Suffice it to state that repetition of the ram movements in sequence many times over, and in rapid succession, will result in stepping advancement of the piston rods 72 of all the cylinders A1, A2, and A3, to their outer limits of travel, for moving the shifter ring 64 to its extreme right-hand position at which the drive for the face plate is at spindle speed.

It might here be stated that check valves 132, 134, and 136 prevent fluid under pressure from the source of supply from entering the distributor through the tubes 178, 180, and 182. The valves, however, will permit fluid flow in the opposite direction, when the reversing valve 108 is manipulated to exhaust fluid from the distributor 100 through conduit 110. The broken double line 158 indicates a fluid passageway connecting tube 182 with the tube 160 leading to hydraulic cylinder A1; the broken double line 184 indicates a fluid passageway connecting tube 180 with the tube 168 leading to hydraulic cylinder A2; and the broken double line 186 indicates a fluid passageway connecting tube 178 with the tube 176 leading to hydraulic cylinder A3. These shunt passageways 158, 184, and 186 make possible the exhausting of fluid from the head ends of cylinders A1, A2, and A3 back to the source of supply, when distributor 102 is activated to charge said cylinders at their rod ends, for withdrawing the piston rod 72. Withdrawal or retraction of the piston rods moves the shifter ring 64 to the left, for meshing the ring gear 44 with the headstock locking ring 60.

It is to be understood that distributor 102 has ram action similar to that of distributor 100, in enforcing a step-by-step retraction of the piston rods of cylinders A1, A2, and A3. Distributor 102 is placed in action by manipulation of the reversing valve 108 to direct fluid pressure into feed line 112, in which case the other feed line 110 becomes a fluid exhaust or return line. When 112 is pressured, fluid is forced to enter the distributor 102 only through conduit 188, because the branch pipes 190, 192, and 194 are limited to one-way flow courses outwardly from the distributor, by check valves 200, 202, and 204.

Distributor 102 is seen to be identical to distribuotr 100. It includes the common feed line 206 in fluid communication with the chambers of all the rams 208, 210, and 212. Distributor 102 also has fluid lines 214, 216, and 218 for transfer of fluid to and from the rod ends of cylinders A3, A2, and A1, respectively. Through the agency of shunt passageways 220, 222, and 224, the several fluid lines 214, 216, and 218, leading to the hydraulic cylinders, have connection with the branch lines 190, 192, and 194, respectively. In all respects the fluid passageways within the distributors, and their connections with the rams, are identical.

Distribtuors of the type disclosed have certain virtues of importance to the present invention. Their rams always operate in regular predetermined sequence, to deliver equal spurts of fluid to the hydraulic cylinders A1, A2, and A3, with the same sequence. Thus, the piston rods 72 will be moved in a common direction, all at the same rate, until their pistons bottom in the cylinders. With bottoming of the pistons, the rams of the distributor stop with the result that no further transfer of fluid will occur. The nature of this type distributor is such, that anything interfering with the operation of one ram results in disabling all of the rams. It is therefore impossible for one hydraulic cylinder piston 72 to lead or trail the others, for cocking or distorting the shifter ring 64.

For any additional information that might be desired concerning the distributors 100 and 102, reference is made to the Type MX Distributor manufactured by Trabon Engineering Corporation, of Solon, Ohio, under U.S. Patent 2,792,911, dated May 21, 1957.

With particular reference now to FIG. 1, it should be understood that the ring gear 44 is provided with two sets of laterally spaced external teeth, one set adjacent each side of said gear, and the coupling ring 54 is provided with two sets of laterally spaced internal teeth, one set adjacent each side thereof.

In the preferred embodiment of the invention, the width of the coupling ring 54 is such that it will assume one or the other of the following three relationships with locking splines 60, 62, and ring gear 44, viz:

(a) When the coupling ring 54 is at one end of its axial travel (left, as in FIG. 1), it will rigidly couple ring gear 44 to the fixed (stator) locking spline 60, thereby locking the ring gear against rotation. Under these conditions the faceplate will be rotated at low speed.

(b) When the coupling ring is being shifted toward the other end of its axial travel, it will simultaneously interconnect both locking splines 60 and 62 to the ring gear 44 whereby no relative motion between said interconnected parts may occur during axial shifting of the said coupling ring.

(c) When the coupling ring is at the other end of its axial travel, it will rigidly couple ring gear 44 to the locking spline 62 carried by the rotatable face plate 24, thereby locking the ring gear for rotation with said face plate. Under these conditions the face plate will be rotated at high speed.

It should be understood that various changes and modifications may be made, within the scope of the appended claims, without departing from the spirit of the invention.

It should further be understood that the description of the shifter ring actuating means relates to those conditions wherein the actuating cylinders A1, A2 and A3 are of equal area. However, in certain instances it may be desirable or necessary that the areas of the three or more cylinders may be different, in which event the corresponding plungers 208, 210, and 212 and 124, 126, and 128 would be proportionately different displacements to compensate for the difference in area of the pistons or cylinders fed by each, the basic requirement in any application being that each plunger displaces a volume of oil such that the piston of its respective cylinder will move the same linear distance as all other pistons in the assembly.

In conclusion it will be noted that another prime objective of the present invention which I have obtained is to provide a shiftable coupling means which is characterized by its extreme torsional rigidity without impairing the lateral or angular freedom of the coupled members.

Specifically, ring gear 44 is adapted to gyrate without rotating so that in a planetary drive system of four planetary gears each of the four planetary gears will always carry its pro rata share of the load. The coupling ring 54 accommodates any gyration of ring gear 44 without allowing any rotation thereof when coupled to the fixed locking spine (stator) 60.

What is claimed is:

1. In a headstock assembly, the combination of a face plate, a drive spindle, and planetary drive means interconnecting said face plate in driven relationship with said drive spindle, said planetary drive means including an annular member shiftable to selectively place the face plate in direct driven relationship with said drive spindle or in reducing driven relationship therewith for rotation at a slower speed and a higher torque than said drive spindle, and a plurality of duplicate hydraulic means sequentially operative to shift said member of said planetary drive means.

2. In a head stock assembly, the combination of a face plate, a drive spindle, and planetary drive means for the face plate including an annular shifter element to change the drive ratio between the spindle and the face plate, a plurality of hydraulic cylinders operatively connected to and spaced around the shifter element for moving the latter to alternative shifted positions, and means for delivering to the hydraulic cylinders sequentially and repeatedly small charges of fluid under pressure to ultimately advance the shifter element to one of its shifted positions.

3. The combination as set forth in claim 2, wherein the several hydraulic cylinders are fixed relative to the headstock, and extend to the shifter element in substantial parallelism with the drive spindle.

4. In a machine tool having a movable part, change-speed gearing for moving said part at different rates and including a shiftable coupling ring gear and a shifter element therefor movable with said gear, a support, a plurality of hydraulic cylinders mounted upon said support in position to move the shifter element to alternative shifted positions, and means for delivering to the hydraulic cylinders sequentially and repeatedly small charges of fluid under pressure to ultimately advance the shifter element in a plurality of steps to one of its shifted positions.

5. The device as set forth in claim 4, wherein the shifter element is spaced from the support, and the hydraulic cylinders are located within the intervening space.

6. In a machine tool having a movable part, change-speed gearing for moving said part at different rates and including an axially shiftable coupling ring gear, and a shifter element therefor in the form of a ring movable axially with said gear, a support, a plurality of hydraulic cylinders mounted upon said support and each including a piston rod secured to the shifter ring marginally thereof, said cylinders being spaced apart on the support, with the piston rods extending in the direction of gear shifting movement, and means for delivering to the hydraulic cylinders sequentially and repeatedly small equal charges of fluid under pressure to move the shifter ring in stepping fashion, for shifting the axially shiftable gear.

7. The apparatus as set forth in claim 6, wherein the combination includes a face plate, and means effecting a rotary drive therefor in the shifted positions of the axially shiftable coupling ring gear.

8. In a lathe headstock assembly, the combination of a face plate, a drive spindle, and a support upon which the drive spindle is journalled for rotation, means rotatably supporting the face plate upon the spindle for rotation relative thereto, a sun gear fixedly related to the spindle, and a planetary gear carried by the face plate for rotation on an axis offset from the spindle axis, a ring gear surrounding the planetary gear and the sun gear of the spindle, said ring gear having internal teeth in mesh with the teeth of the planetary gear, while the teeth of the planetary gear are in mesh with those of the sun gear, an axially shiftable coupling ring including means for alternatively locking the ring gear to the support or to the face plate selectively, a plurality of spaced hydraulic cylinders mounted upon the support aforesaid, and each including a piston rod operative to move the coupling ring axially between the alternative locking positions mentioned, and means for delivering to the hydraulic cylinders sequentially and repeatedly small charges of fluid under pressure to move the piston rods and the coupling ring associated therewith in infinitesimal step fashion.

9. The combination as set forth in claim 8, wherein the hydraulic cylinders are so arranged upon the support as to impart pulses of equal value to the coupling ring, to avoid cocking of the latter in its axial movements.

10. In a lathe headstock assembly, the combination of a face plate, a drive spindle, and a support upon which the drive spindle is journalled for rotation, means supporting the face plate upon the spindle for rotation relative thereto, a sun gear fixedly related to the spindle, and an externally toothed planetary gear carried by the face plate for rotation on an axis offset from the spindle axis, a ring gear surrounding the planetary gear and the sun gear of the spindle, said ring gear having internal teeth in mesh with the teeth of the planetary gear, while the teeth of the planetary gear are in mesh with those of the sun gear, an axially shiftable coupling ring including means for alternatively locking the ring gear to the support or to the face plate selectively upon shifting of said coupling ring to opposite extremes of travel, a shifter ring surrounding the coupling ring and including a connection therewith imparting axial movements of the shifter ring to the coupling ring, a plurality of hydraulic cylinders mounted upon the support and each including a piston rod secured to the shifter ring marginally thereof, said cylinders being spaced apart upon the support, with the piston rods secured to the shifter ring marginally of the latter, and means for delivering to the hydraulic cylinders sequentially and repeatedly small equal charges of fluid under pressure to move the shifter ring and its associated coupling ring in stepping fashion to and from its opposite extremes of travel.

11. The combination as set forth in claim 10, wherein the fluid delivery means includes a pair of fluid distributors each adapted to feed and exhaust opposite ends of each hydraulic cylinder.

12. A headstock assembly comprising in combination, a face plate, a drive spindle, and a support upon which the drive spindle is journalled for rotation, means rotatably supporting the face plate upon the spindle for rotation relative thereto, gear means including a reciprocable gear shifter for alternatively placing the face plate into and out of direct drive relationship with the spindle, and means for control of the gear shifter, including a plurality of hydraulic cylinders mounted fixedly relative to the support in position to move the gear shifter toward a limit of its reciprocation, and means for delivering to the hydraulic cylinders sequentially and repeatedly, small charges of fluid under pressure which eventually and at a common rate extend the cylinders for moving the gear shifter.

13. The combination as set forth in claim 12, wherein the combination includes gearing controlled by the shifter and operative to drive the face plate at a speed different from that of the spindle, whenever the face plate is out of direct drive relationship with the spindle.

14. In a headstock assembly, the combination of a headstock, a rotatable drive spindle extending forwardly of said headstock, a rotatable face plate, a sun gear on said spindle, planetary drive means including a plurality of planetary gears carried by and rotatable relative to said face plate and in driven relationship with said sun gear, a ring gear having internal teeth engaging said planetary gears and two sets of laterally spaced external teeth, an axially shiftable coupling ring circumscribing said ring gear, said coupling ring having two sets of laterally spaced internal teeth, a first locking spline fixed relative to said headstock, a second locking spline fixed relative to said face plate, the internal teeth of said coupling ring adapted to selectively engage and interconnect: said first spline to said ring gear, both the first and second spline gears and said ring gear, or the second locking spline and said ring gear, and means selectively operative to shift said coupling ring for locking said ring gear to one or the other of said locking splines, for placing said face plate in one or the other of two driven relationships with said spindle.

15. In a headstock assembly, the combination of a headstock, a rotatable drive spindle extending forwardly of said headstock, a rotatable face place journalled on said spindle, a sun gear in driven relationship with said spindle, planetary drive means, including a plurality of planetary gears carried by and rotatable relative to said face plate and in driven relationship with said sun gear, a ring gear having internal teeth engaging said planetary gears and two sets of laterally spaced external teeth, an axially shiftable coupling ring circumscribing said ring gear, said coupling ring having two sets of laterally spaced internal teeth, a first locking spline fixed relative to said headstock, a second locking spline fixed relative to said face plate, the internal teeth of said coupling ring adapted to selectively engage and interconnect said first spline to said ring gear when said coupling ring is at one end of its axial travel, to selectively and simultaneously engage both the first and second spline gears and said ring gear when said coupling ring is midway of its overall axial travel, and to selectively engage the second locking spline and said ring gear when said coupling ring is at the other end of its axial travel, and means selectively operative to shift said coupling ring from one end of its axial travel to the other.

(References on following page)

References Cited in the file of this patent

UNITED STATES PATENTS

| | | |
|---|---|---|
| 1,870,188 | Abrams | Aug. 2, 1932 |
| 2,225,913 | Lange et al. | Dec. 24, 1940 |
| 2,279,710 | Kylin | Apr. 14, 1942 |
| 2,342,880 | Masek | Feb. 29, 1944 |
| 2,419,639 | Groene | Apr. 29, 1947 |
| 2,814,422 | Mercier | Nov. 26, 1957 |
| 3,022,690 | Binns | Feb. 27, 1962 |

FOREIGN PATENTS

| | | |
|---|---|---|
| 9,855 | Great Britain | 1885 |